Figure 4:
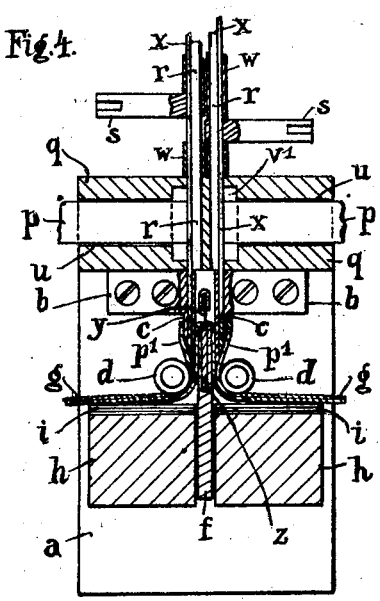

March 10, 1925.
O. PLATTE
PROCESS AND APPARATUS FOR MANUFACTURING SHOE LACES
Filed May 31, 1924  2 Sheets-Sheet 1
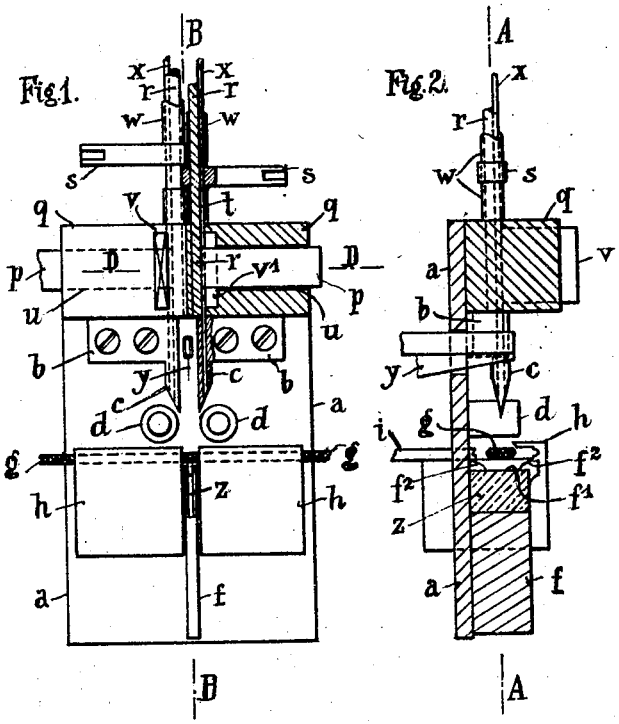
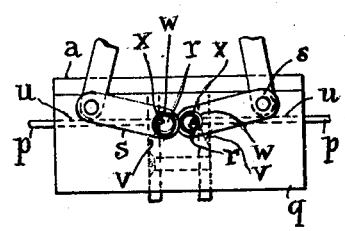
Fig.3.
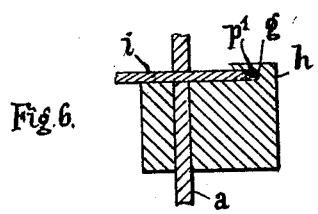
Fig.6.
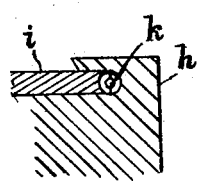
Fig.9.
Inventor
Otto Platte
by [signature]
Attorney March 10, 1925. 1,529,142
O. PLATTE
PROCESS AND APPARATUS FOR MANUFACTURING SHOE LACES
Filed May 31, 1924 2 Sheets-Sheet 2

Inventor
Otto Platte.
by
Attorney

Patented Mar. 10, 1925.

1,529,142

UNITED STATES PATENT OFFICE.

OTTO PLATTE, OF BARMEN, GERMANY, ASSIGNOR OF ONE-HALF TO PAUL BÜNGER, OF BARMEN, GERMANY.

PROCESS AND APPARATUS FOR MANUFACTURING SHOE LACES.

Application filed May 31, 1924. Serial No. 716,883.

*To all whom it may concern:*

Be it known that I, OTTO PLATTE, a citizen of the German Republic, and residing at Barmen, Rhenish Prussia, Germany, have invented certain new and useful Improvements in Processes and Apparatus for Manufacturing Shoe Laces, for which I have filed applications for Letters Patent in Germany on October 21, 1922, and April 26, 1924, and of which the following is a specification.

It is well known to stiffen the ends of laces or provide them with tags by inserting celluloid rods or sticks into the ends of the lace which is manufactured as a braided or woven tube and by then pressing the ends in heated dies or moulds, whereby the softening celluloid impregnates the lace from the inside. The lace-tags so manufactured are very popular because externally the character of the woven or braided fabric is preserved, and at the same time, owing to the celluloid projecting from the end of the lace, a solid point free from fabric is formed which prevents the lace from fraying. This process is however complicated and tedious since the celluloid rods must be inserted by hand into the ends of the lace which has been cut to the desired length.

The subject-matter of the invention is a process for considerably simplifying and facilitating the insertion of the celluloid rods into the laces. According to the invention, the celluloid rods are inserted mechanically into the fabric which serves for production of the laces and consists of a braided or woven tube, by making a slit in the wall of the woven or braided tube and then introducing the celluloid rod through the slit into the interior of the tube. The slitting of the tubular fabric and the insertion of the celluloid rod are preferably effected by means of a hollow needle, which is thrust into the wall of the woven or braided tube, whereupon the celluloid rod is introduced through the needle duct into the interior of the tube.

The new process is best carried out in such manner that each time the portion of the continuous tube which furnishes the adjacent ends of two laces is bent into U-form, a hollow needle is inserted into each of the outer walls of the two limbs of the tube and then two strips or rods of celluloid are introduced into the tube through these needles, while the tube is simultaneously severed between the two rods, and the two ends of the tube, which now contain the celluloid rods, are then pressed in known manner in moulds or dies. The new process can, with the exception of the introduction of the tubular fabric into the apparatus, be carried out wholly mechanically, so that a rapid and economical manufacture of laces of the kind referred to is possible.

An example of apparatus for carrying out the new process is shown in its essential parts in the accompanying drawing wherein :—

Fig. 1 shows in one half a front view and in the other half a vertical section on the line A—A in Fig. 2, the operative tools having the position necessary for the introduction of the continuous tube of fabric.

Fig. 2 a vertical section on the line B—B in Fig. 1,

Fig. 3 a plan view,

Fig. 4 also a vertical section on line A—A in Fig. 2 but with the tools in the position in which the celluloid rods are inserted into the continuous tube.

Figure 5:
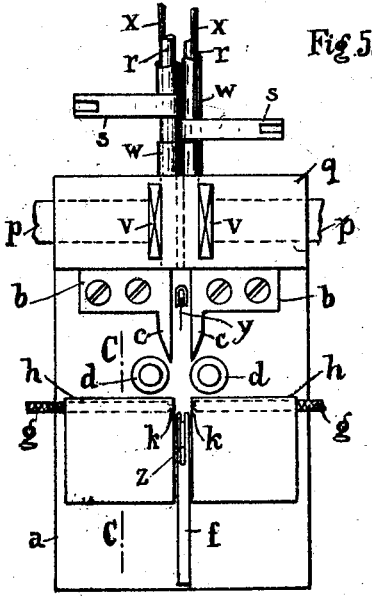

Fig. 5 a front view of the apparatus when the two ends of the laces are being pressed, and Fig. 6 a section through a mould on the line C—C in Fig. 5.

Figure 7:
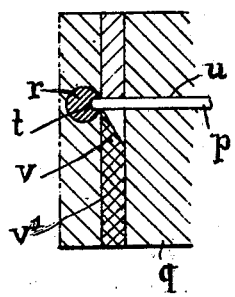
Figure 8:
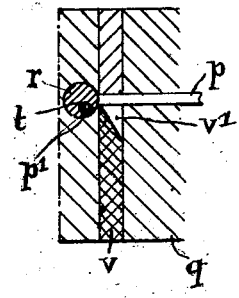

Figs. 7 and 8 are two sections on the line D—D in Fig. 1 through the device for distributing the celluloid rods, being shown on a somewhat larger scale, the movable knife being shown in Fig. 7 in its position before cutting and in Fig. 8 in its position after cutting, and Fig. 9 shows on a somewhat larger scale a section on the line C—C in Fig. 5 through a closed mould but without the material to be moulded.

Referring to the drawing, on a vertical wall $a$ are fitted by means of angular plates $b, b$ two downwardly directed hollow needles $c, c$ each consisting of a tube rectangular in cross-section and bevelled off to one side at its lower end. Below the two tubes $c, c$ are journalled two guide-rollers $d, d$. Between the two needles $c, c$ and the two guide-rollers $d, d$ a flat thrust-member or slide $f$ is mounted for up and down vertical movement which member is coupled with a suitable device for giving it motion and has at its upper edge a recess $f^1$ (Fig. 2) in which the tube $g$ to be operated upon can lie. Below the two rollers $d$, $d$ and at both sides of the plane of the thrust-member $f$ are located, two pressure devices, of a kind known per se, each consisting of a front, fixed mould $h$ and a rear horizontally movable plunger $i$ operated by suitable driving means. The axes of the moulds are parallel to the wall $a$ but at right angles to the slide $f$. The pressing tools, as is clearly seen from Fig. 9 are formed, in a manner known per se, so that in the inner end position of the plunger $i$ the cylindrical or conical space enclosed by this and the mould $h$ is closed in the direction of the thrust-member $f$ except for a small aperture $k$ serving as outlet for gases and for possible excess celluloid.

Between the two needles $c$, $c$ is arranged a knife $y$ which serves for severing the continuous tube $g$ and consists for example of a steel plate secured in a holder, said knife being mounted at such a height that the slide $f$ in its upper end position engages the downwardly directed cutting edge of this knife. To prevent damage to, and rapid wear of, the cutting edge of the knife the slide $f$ is provided at its upper end with a recess containing an insertion $z$ of a soft, yielding material, for instance, of soft rubber. If desired there may be provided in the upper edge of the slide $f$ merely a narrow longitudinal slit for the entry of the knife. The cutting edge of the knife $y$ runs preferably at an inclination to the horizontal in order to give an easy cut.

At the upper end of the tubes or hollow needles $c$, $c$ is located a device for distributing the celluloid rods. In the embodiment shown there is journalled, above each needle $c$ and in a vertical bore of a bearing $q$ secured to the wall $a$, a vertical spindle $r$ which acts as a parting knife, which spindle may be partially rotated backwards and forwards through a predetermined angle by means of a lever-arm $s$ secured to it and of suitable driving mechanism. On its periphery the spindle $r$ is provided with a longitudinal groove $t$ the depth of which corresponds with the width of the rod to be cut off from the celluloid strip $p$ which is fed to it. In the normal position of rest of the spindle $r$, as shown in Figs. 1, 3 and 7, the groove $t$ is located at the mouth of the slot $u$ in member $q$ for supplying the celluloid strip, so that the forward end of the celluloid strip, which is advanced intermittently by suitable means, can enter the groove $t$, the latter limiting the advance of the strip $p$. The rear longitudinal edge of the groove constitutes a cutting edge which coacts with a stationary knife $v$, which is mounted in front of the slot $u$ for supplying the celluloid strip and is located in a slot $v^1$ arranged at right angles to the latter. When the spindle $r$ is turned into its other end position shown in Figs. 4 and 8, the end of the celluloid strip $p$ located in said groove is cut off. In this other end position of the spindle $r$ the groove $t$ is located at the upper mouth of the duct of the respective needl $c$, so that this groove constitutes a direct continuation of the duct in the needle.

In the groove of the spindle $r$, which is extended upwardly above the member $q$ and there surrounded by a tube $w$ is guided a solid needle $x$ which serves to drive the celluloid rod downwardly through the duct in the respective hollow needle $c$. The needle $x$ is moved up and down by suitable gearing in accordance with the rotary movements of the spindle $r$.

Finally, at both sides of the device illustrated are arranged two resilient arms, known per se, which keep stretched the continuous tube $g$ fed into the device. The resilient arms as well as the mechanism for actuating the slide $f$, plunger $i$, spindle $r$ and needle $x$ and for feeding the celluloid strips $p$, $p$ are not shown in order to avoid complication of the drawing and because these mechanisms may be of a well known kind and constitute no part of the invention.

The mode of operation of the new apparatus is as follows. With the operative parts in the position shown in Figs. 1 and 2 the continuous tube of fabric $g$ is inserted between the rollers $d$, $d$ and the moulds $h$, $h$ and then secured at both sides of the apparatus in the grippers of the spring arms which are not illustrated. These arms hold the tube in stretched condition in such manner that it is located above the recess $f^1$ in the slide $f$. Thereupon the latter is moved upwardly by means of an eccentric or the like into the position shown in Fig. 4. In this position the portion of the tube $g$ located between the operating implements is bent U-shape around the recessed edge of the slide $f$ owing to the co-operation of the rollers $d$, $d$ and said slide, and is simultaneously advanced against the points of the needles $c$, $c$ in such manner that the latter pierce the outer walls of the two limbs of the tube (as the ducts of an injection needle penetrate the wall of the vein) and thus slit open said walls. Further the crown of the U-shaped portion of the tube is pressed by the slide $f$ against the cutting edge of the knife $y$ and the tube is thus cut into two pieces.

Simultaneously with the upward movement of the slide $f$ the two spindles $r$, $r$ are turned from the position shown in Figs. 1, 3 and 7 into that shown in Figs. 4 and 8. In this way the ends of the celluloid strips $p$, $p$ located in the grooves $t$ of the spindles $r$ are cut off and the celluloid rods $p^1$ obtained thereby brought to the upper end of the needles $c$, $c$. The celluloid rods are now pushed through the passages in the hollow needles $c$, $c$ into the interior of the two limbs of the U-shaped portion of the tube by the downward movement of the solid needles *x, x*. Thereupon the solid needles *x, x* again move upwardly and the spindles *r, r* are turned back into the initial position in order to receive the ends of the celluloid strips which are to be cut off at the next operative movement, while the slide *f* is retracted into its lower end position. Simultaneously the ends of the severed tube *g* are withdrawn from the needles *c, c* owing to the spring action of the lateral arms. When the ends of the tube are withdrawn from the needles *c, c,* the lower ends of the celluloid rods are gripped between the slide *f* and the rollers *d, d* and carried with them, consequently the celluloid rods, the upper ends of which may still be in the passage in the needles *c, c* are completely withdrawn from the latter. When the slide *f* has reached its lower end position the tube *g* again occupies its horizontal stretched position (Fig. 5) and the two ends of the tube, which each contain a celluloid rod and which are somewhat separated by the spring arms, are located in the aforesaid position between the moulds *h, h* and the plungers *i, i*. The said plungers *i, i* now advance and press the ends of the tube into the desired pointed shape. The moulds must of course be heated, as is known per se, or the rods must be treated with a solvent so that the celluloid softens in the pressing process and impregnates the ends of the tube from within. The softened celluloid protrudes partly from the ends of the tube and forms on the latter firm, solid points. Gases and possible excess of celluloid can escape from the pressure devices through the outlets *k, k*. When the application of pressure has ceased, the plungers *i, i* return and the two stiffened portions of the tube at the ends which face each other may be withdrawn from the moulds. Another part of the continuous tube is then inserted in the apparatus and the above-described cycle of operations is repeated. At the next operation the slide *f* simultaneously removes any excess of celluloid which may have escaped through the outlets *k* of the mould, since the upper edges of said slide which are located before and behind the recess *f¹* move like a knife across those faces of the moulds *h, h* and plungers *i, i* which face the slide.

Obviously the invention is not limited to the embodiment shown and described, on the contrary both alterations in the embodiment shown and also other embodiments are possible. For example, the severing of the tube *g* instead of taking place simultaneously with the insertion of the needles *c, c* might take place when the slide *f* has returned into its lower end position and the continuous tube *g* is again in its horizontal position. In this case there must be arranged at the height of the mould *h, h* a shearing device, which for the purpose of cutting the tube, advances through an opening in the wall *a* between the two moulds *h, h* and is again retracted after cutting. Moreover instead of two separate celluloid rods, only a single rod for two lace tags might be introduced into the continuous tube. In this case the portion of the tube which contains the celluloid rod is pressed in a mould which is of the length of two lace tags, and the tube is then severed in the middle of the part so stiffened, whereby two lace tags are also produced. In this case of course only one needle for inserting the celluloid rod is needed. Finally the wall of the woven or braided tube might be slit by other suitable devices instead of by the hollow needle *c, c* for example, by means of a kind of claw, in which case the celluloid rod supplied through a tube is introduced into the interior of the tubular fabric while being guided by the claw, being passed through the slit in the wall of the tube by said claw.

In the above description and in the claims hereinafter for the sake of brevity, only celluloid rods have been referred to. The rods to be inserted into the web may of course consist of some other suitable material which softens by heat or by being moistened with a solvent and which then rehardens when cold or dried. The solvent employed may be automatically supplied (e. g. by means of wicks).

Claims:

1. Process for manufacturing laces the ends of which are stiffened by introducing a celluloid rod and pressing in a mould characterized in that the celluloid rods are inserted into the material, consisting of a woven or braided tube, from which the laces are made, by making a slit in the wall of the tube and then introducing a celluloid rod through the slit into the interior of the tube.

2. Process according to claim 1, characterized in that the celluloid rods are introduced into the tubular fabric from which the laces are made by inserting a hollow needle into the wall of the woven or braided tube and then introducing the celluloid rod into the interior of the tube through the passage in the hollow needle.

3. Process according to claim 1, characterized in that the portion of the tube which receives the celluloid which forms the adjacent ends of two laces, is bent into U-shape, inserting a hollow needle into the outer wall of each of the two limbs of the tube, introducing two celluloid rods into the interior of the tube through these needles, severing the tube between the two portions into which the rods are introduced, and finally pressing the two ends of the tube with the celluloid rods in them in known manner, in moulds.

4. A machine for manufacturing laces with stiffened ends, the lace having a braided tube into which a length of celluloid is inserted for stiffening the same, comprising guide rollers, downwardly directed hollow needles arranged above the rollers, a device for distributing celluloid rods to the needles, a slide for supporting the tube of the lace, said slide being movable vertically between the rollers and needles for moving the tube upwardly between the rollers and presenting the bent tube against the needles whereby the latter will penetrate the outer walls of the bent tube, a stationary knife mounted between the needles for severing the adjacent wall of the tube to divide the latter, and pressure devices for pressing the ends of the severed tube sections containing the celluloid rods.

5. A machine according to claim 4 characterized in that the slide is provided at its upper edge with a yieldable seat for supporting the tube when the latter is presented to the knife.

6. A machine according to claim 4 characterized by their being journaled above each needle a cylindrical member formed with a longitudinal groove to receive the forward edge of a celluloid strip, one edge of the groove co-acting with a stationary cutting edge to sever a rod-like portion from the strip, said cylindrical member being movable with the severed rod of celluloid to a position over the hollow needle whereby the groove of the member is brought into alinement with the passage of the needle 7. A machine according to claim 4 characterized by their being journaled above each needle a cylindrical member formed with a longitudinal groove to receive the forward edge of a celluloid strip, one edge of the groove co-acting with the stationary cutting edge to sever a rod-like portion from the strip, said cylindrical member being movable with the severed rod of celluloid to a position over the hollow needle whereby the groove of the member is brought into alinement with the passage of the needle, and a solid needle movable in the groove of the cylindrical member for effecting a discharge of the celluloid rod from the groove and through the needle into the lace tube.

8. A lace stiffening machine comprising spaced hollow needles, a slide movable therebetween in the direction of their axes, to present a lace tube to the needles and thread the same thereover, and means for feeding stiffening material through the hollow needles into the lace tubes.

9. A lace stiffening machine comprising spaced hollow needles, a slide movable therebetween in the direction of their axes, to present a lace tube to the needles and thread the same thereover, means for severing rods of celluloid from a fed strip and delivering the same to the needles to be discharged therethrough into the lace tube, and means for dividing the latter between the needles.

10. In a machine of the class described, a tube support, spaced guides thereover, a pair of hollow needles arranged above the guides, a knife between the needles, and means for moving the tube from the support upwardly between the guides and into engagement successively with the needles and the knife.

11. In a machine of the class described, a tube support, spaced guides thereover, a pair of hollow needles arranged above the guides, a knife between the needles, means for moving the tube from the support upwardly between the guides and into engagement successively with the needles and the knife, and means for feeding stiffening material through the needle into the severed ends of the tube.

12. A machine in accordance with claim 11 characterized in that said feeding means comprises a rotary cylinder having a peripheral pocket to receive and sever a supply of stiffening material from a main supply, means for rotating the cylinder to present the pocketed material to the needle, and means for ejecting the material through the needles into the tubes.

In testimony whereof I affix my signature.

OTTO PLATTE.